United States Patent
Lee

(10) Patent No.: US 11,813,679 B2
(45) Date of Patent: Nov. 14, 2023

(54) INSERT HOLDER AND CUTTING TOOL ASSEMBLY INCLUDING THE SAME

(71) Applicant: TAEGUTEC LTD., Daegu (KR)

(72) Inventor: Sang Young Lee, Daegu (KR)

(73) Assignee: TaeguTec Ltd., Daegu (KR)

( * ) Notice: Subject to any disclaimer, the term of this patent is extended or adjusted under 35 U.S.C. 154(b) by 80 days.

(21) Appl. No.: 17/172,170

(22) Filed: Feb. 10, 2021

(65) Prior Publication Data

US 2022/0250172 A1 Aug. 11, 2022

(51) Int. Cl.
| B23C 5/10 | (2006.01) |
| B23B 31/107 | (2006.01) |
| B23B 51/00 | (2006.01) |

(52) U.S. Cl.
CPC ............ *B23C 5/10* (2013.01); *B23B 31/1075* (2013.01); *B23B 51/0004* (2022.01); *B23B 51/0005* (2022.01); *B23B 2231/0204* (2013.01)

(58) Field of Classification Search
CPC ............ B23B 51/0003; B23B 51/0004; B23B 51/0005; B23B 2205/04; B23B 29/14; B23B 2240/00; B23B 2240/36; B23B 2270/06; B23B 2270/08; B23B 31/1075; B23G 2200/10; B23C 2240/24; B23C 2240/00; B23C 2270/06; B23C 2270/08
See application file for complete search history.

(56) References Cited

U.S. PATENT DOCUMENTS

| 4,557,642 | A | | 12/1985 | Dudás et al. |
| 4,930,956 | A | | 6/1990 | Mantovani |
| 5,873,682 | A | * | 2/1999 | Tripsa ................ B23B 31/1075 |
| | | | | 407/89 |
| 5,988,953 | A | * | 11/1999 | Berglund ............... B23B 51/02 |
| | | | | 408/230 |
| 6,506,003 | B1 | | 1/2003 | Erickson |
| 6,582,164 | B1 | | 6/2003 | McCormick |
| 7,240,594 | B2 | * | 7/2007 | Erickson ............ B23B 31/1075 |
| | | | | 408/239 R |
| 7,713,004 | B2 | | 5/2010 | Lehto et al. |
| 2012/0009027 | A1 | | 1/2012 | Sharivker et al. |
| 2022/0118527 | A1 | * | 4/2022 | Hecht ................... B23B 31/103 |

FOREIGN PATENT DOCUMENTS

| CN | 108698139 A | * | 10/2018 | ........... B23B 31/107 |
| DE | 102004026873 A1 | * | 12/2005 | ......... B23B 31/1076 |
| EP | 1306151 A1 | * | 5/2003 | ....... B23B 29/03428 |
| GB | 765943 | | 11/1954 | |

* cited by examiner

*Primary Examiner* — Sunil K Singh
*Assistant Examiner* — Reinaldo A Vargas Del Rio
(74) *Attorney, Agent, or Firm* — Womble Bond Dickinson (US) LLP

(57) ABSTRACT

A cutting tool assembly includes a tool shank having a coupling opening, and an insert holder having an insert body to which an insert is coupled and detachably attached. A coupling protrusion protrudes from one surface of the insert body and is detachably coupled to the tool shank. Located on the coupling protrusion are a tapered contact portion which comes into contact with the coupling opening and provides a fixing force to fix the insert holder to the tool shank, and a contact surface at a rear end of the tapered contact portion which couples to a fastening member.

23 Claims, 19 Drawing Sheets

180deg Cylinder Contact

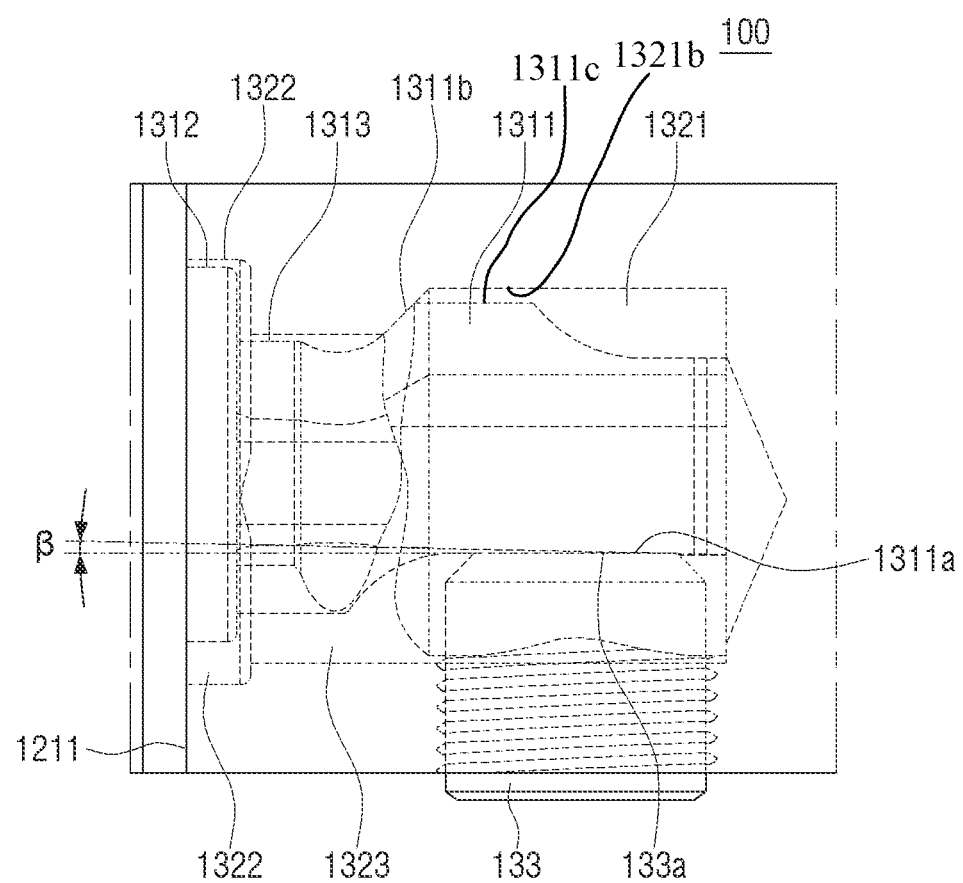

INSERT HOLDER AND CUTTING TOOL ASSEMBLY INCLUDING THE SAME

BACKGROUND

1. Field of the Disclosure

The present disclosure relates to an insert holder and a cutting tool assembly including the same, and particularly, to a cutting tool assembly configured to secure a coupling force between a tool shank and an insert holder replaceably coupled to the tool shank and to which an insert is coupled and configured to secure coupling reliability in being operated.

2. Description of the Related Art

A tool coupling configured to reliably join a first component to a second component may be provided in a cutting tool. In some of such cutting tools, a tool coupling may be a screw-thread-type coupling.

Examples of such cutting tools are disclosed in U.S. Pat. Nos. 6,582,164, 7,713,004, and U.S. Patent Application No. 2012/0009027.

In other cutting tools, a tool coupling provides a differential action of reliably fastening a first component and a second component together. Examples of such cutting tools are disclosed in G.B. Patent Registration No. 765943, U.S. Pat. Nos. 4,930,956, and 4,557,642.

In still other cutting tools, a tool coupling may generally include a stop surface extending in a radial direction. Examples of such cutting tools are disclosed in U.S. Pat. Nos. 6,506,003 and 5,988,953.

SUMMARY

Aspects of the present disclosure provide an insert holder and a cutting tool assembly including the same on which the insert holder including a variety of shapes of inserts is mounted using one tool shank and which is configured to easily assemble/disassemble a head module and a tool shank.

Aspects of the present disclosure also provide an insert holder and a cutting tool assembly including the same configured to secure reliability in coupling between the insert holder and a tool shank and to maintain reliability in coupling between the insert holder and the tool shank while a cutting tool performs a cutting operation.

It should be noted that objects of the present disclosure are not limited to the above-mentioned objects, and other objects of the present disclosure will be understood by those skilled in the art from the following descriptions.

To achieve the above objects, a cutting tool assembly comprises a tool shank comprising a coupling opening: and an insert holder comprising an insert body to which an insert is coupled and detachably attached and a coupling protrusion protruding from one surface of the insert body and detachably coupled to the tool shank, wherein a tapered contact portion coming into contact with the coupling opening and providing a fixing force to fix the insert holder to the tool shank and a contact surface at a rear end of the tapered contact portion and coupled to a fastening member are located on the coupling protrusion.

BRIEF DESCRIPTION OF THE DRAWINGS

The above and other aspects and features of the present disclosure will become more apparent by describing in detail exemplary embodiments thereof with reference to the attached drawings, in which:

FIG. 9 is a coupling view illustrating a state in which the coupling protrusion is mounted on and then pressed against and coupled to the coupling opening due to the fastening member in the cutting tool assembly according to some exemplary embodiments of the present disclosure.

DETAILED DESCRIPTION OF THE EMBODIMENTS

Figure 1:
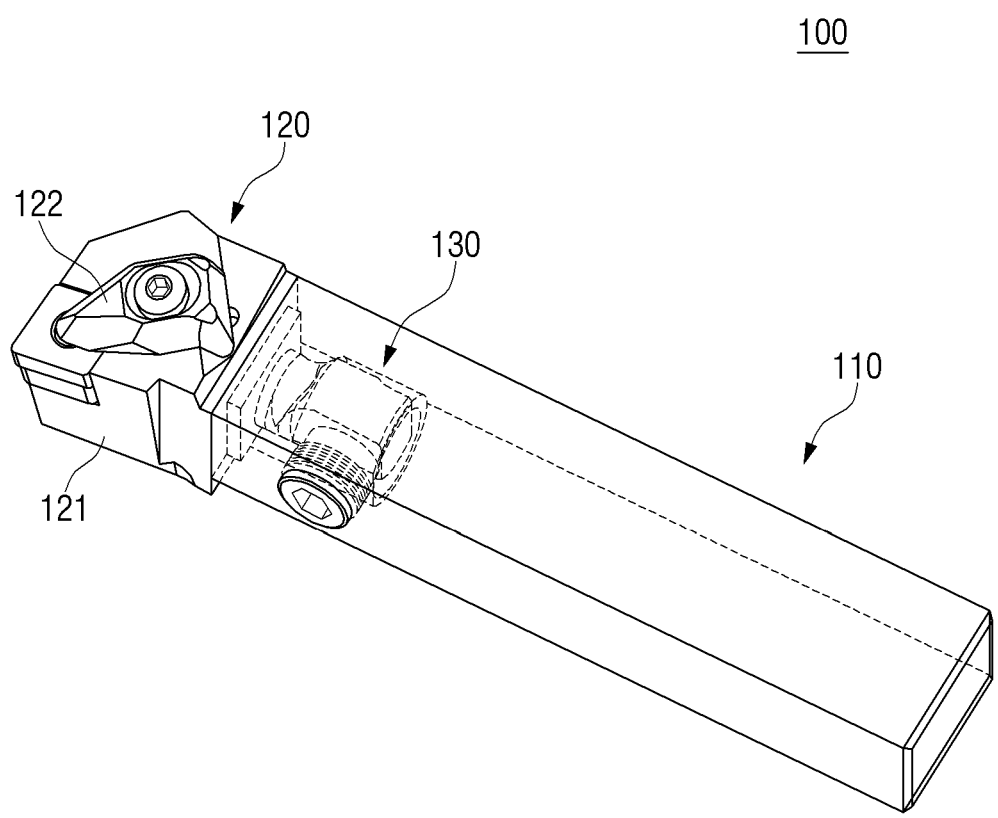
FIG. 1 is a schematic coupling perspective view of a cutting tool assembly according to some exemplary embodiments of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these exemplary embodiments are provided so that this disclosure will be thorough and complete and will fully convey the concept of the present disclosure to those skilled in the art, and the present disclosure will only be defined within the scope of the appended claims. In the drawings, like reference numerals indicate like elements.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

In the following description of the present disclosure, the terms used are for explaining exemplary embodiments of the present disclosure, but do not limit the scope of the present disclosure. In the description, a singular expression may include a plural expression unless specially described. The term "comprises" and/or "comprising" used in the description means that one or more other components, steps, operation and/or existence or addition of elements are not excluded in addition to the described components, steps, operation and/or elements. Further, the term "and/or" includes each of mentioned items and all combinations of one or more of the items.

Hereinafter, a cutting tool assembly 100 according to some exemplary embodiments of the present disclosure will be described with reference to the drawings.

Figure 2:
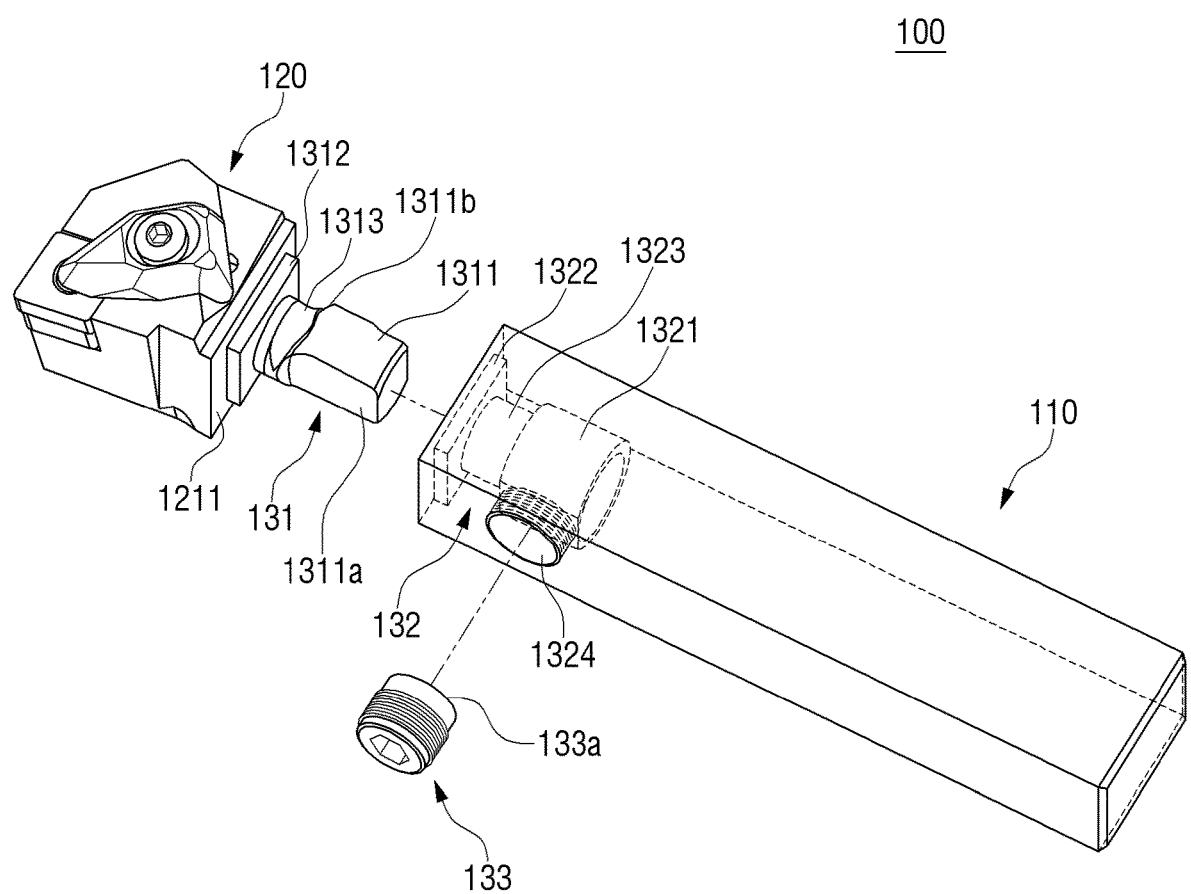
FIG. 2 is a schematic separate perspective view of the cutting tool assembly according to some exemplary embodiments of the present disclosure.
Figure 3:
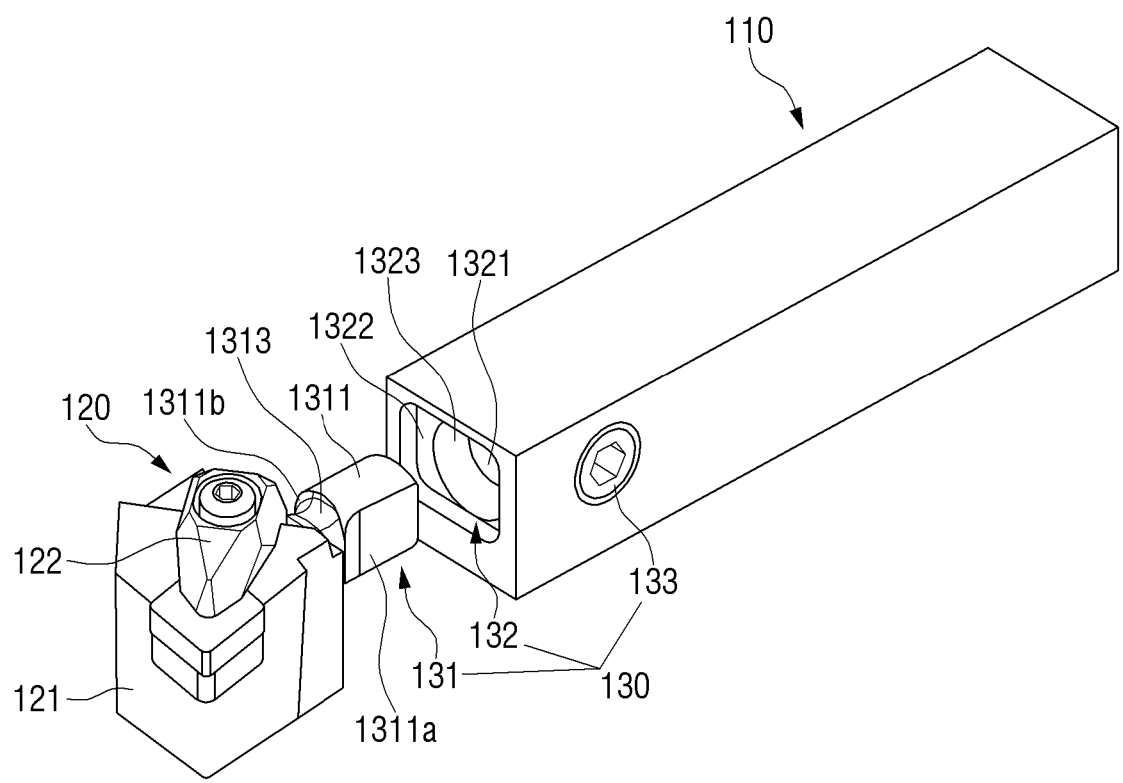
FIG. 3 is a perspective view illustrating the cutting tool assembly according to some exemplary embodiments of the present disclosure from which an insert holder and a tool shank are separated when viewed in a different direction.

FIG. 1 is a schematic coupling perspective view of a cutting tool assembly 100 according to some exemplary embodiments of the present disclosure. FIG. 2 is a schematic separate perspective view of the cutting tool assembly 100 according to some exemplary embodiments of the present disclosure. FIG. 3 is a perspective view illustrating the cutting tool assembly 100 according to some exemplary embodiments of the present disclosure from which an insert holder 120 and a tool shank 110 are separated when viewed in a different direction.

Referring to FIGS. 1 to 3, the cutting tool assembly 100 according to some exemplary embodiments of the present disclosure may include the insert holder 120 and the tool shank 110, a coupling portion 130 including a coupling protrusion 131 configured to couple the insert holder 120 and the tool shank 110 together, a coupling opening 132, and a fastening member 133.

The insert holder 120 may be configured to detachably couple inserts 122 having a variety of shapes to one surface thereof and to be attachable to or detachable from the tool shank 110 which will be described below.

The insert holder 120 may include the insert 122, an insert body 121, and the coupling protrusion 131 among the components of the coupling portion 130.

The insert body 121 may include an insert-detachment surface to or from which the insert 122 is attached or detached. In some exemplary embodiments of the present disclosure, the insert body 121 is exemplified as being configured to allow the insert 122 to be attached thereto or detached therefrom but is not limited thereto. The insert 122 and the insert body 121 may be integrally formed or a variety of modifications or changes thereof may be made.

The coupling protrusion 131 may be configured to protrude from one surface 1211 of the insert body 121. A detailed structure, configuration, and shape of the coupling protrusion 131 will be described in detail when coupling between the coupling protrusion 131 and a coupling opening 132 of the tool shank 110 is described.

The tool shank 110 is configured to allow the insert holder 120 to be attachable to or detachable from one surface thereof. The tool shank 110 may include the coupling opening 132 among the components of the coupling portion 130 for inserting the coupling protrusion 131 and may include a fastening groove 1324 into which the fastening member 133, which will be described below, is inserted.

The fastening member 133 may be configured to be engaged with one surface of the coupling protrusion 131 mounted on the coupling opening 132 through the fastening groove 1324 formed in at least one surface of the tool shank 110, for example, a side surface of the tool shank 110, and to pressurize the coupling protrusion 131. While being fastened to the fastening groove 1324, the fastening member 133 may be configured to push the coupling protrusion 131 in an axial direction of the fastening member 133 to allow the coupling protrusion 131 to be pressed against and coupled to the coupling opening 132.

While the fastening member 133, as a fastening device such as a screw, moves in an axial direction along a screw thread due to rotation of the fastening member 133, an end of the fastening member 133 may move into the coupling opening 132 through the fastening groove 1324 and may face the coupling protrusion 131.

As described below, a contact surface 1311a which comes into contact with the fastening member 133 may be provided in a flat surface shape on one surface of the coupling protrusion 131. A tapered contact portion 1311b which may be held by, come into contact with, and be coupled to the coupling opening 132 due to a pressure of the fastening member 133 may be formed on an opposite surface of the contact surface 1311a as another surface of the coupling protrusion 131.

Figure 4:
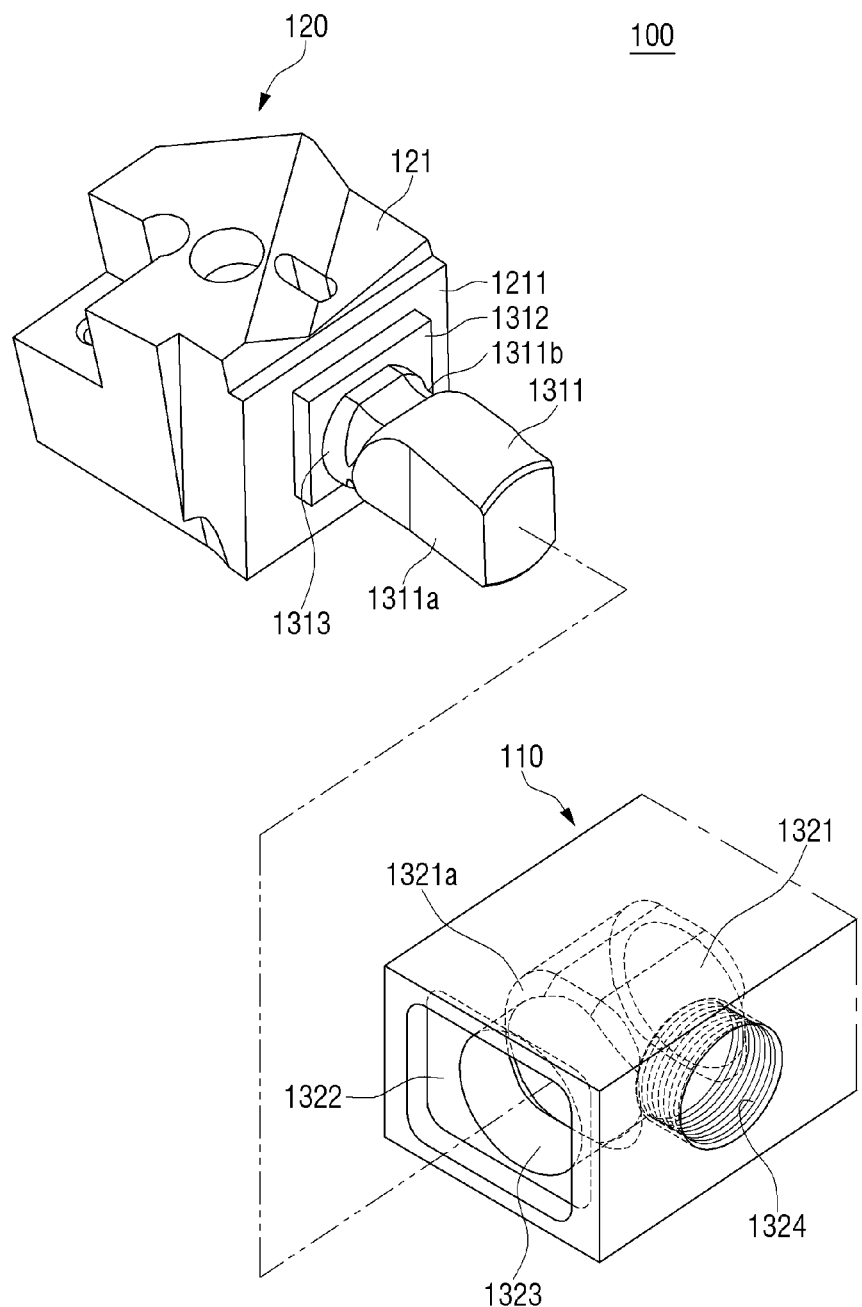
FIG. 4 is a partial one direction separate perspective view schematically illustrating coupling between the insert holder and the tool shank in the cutting tool assembly according to some exemplary embodiments of the present disclosure.
Figure 5:
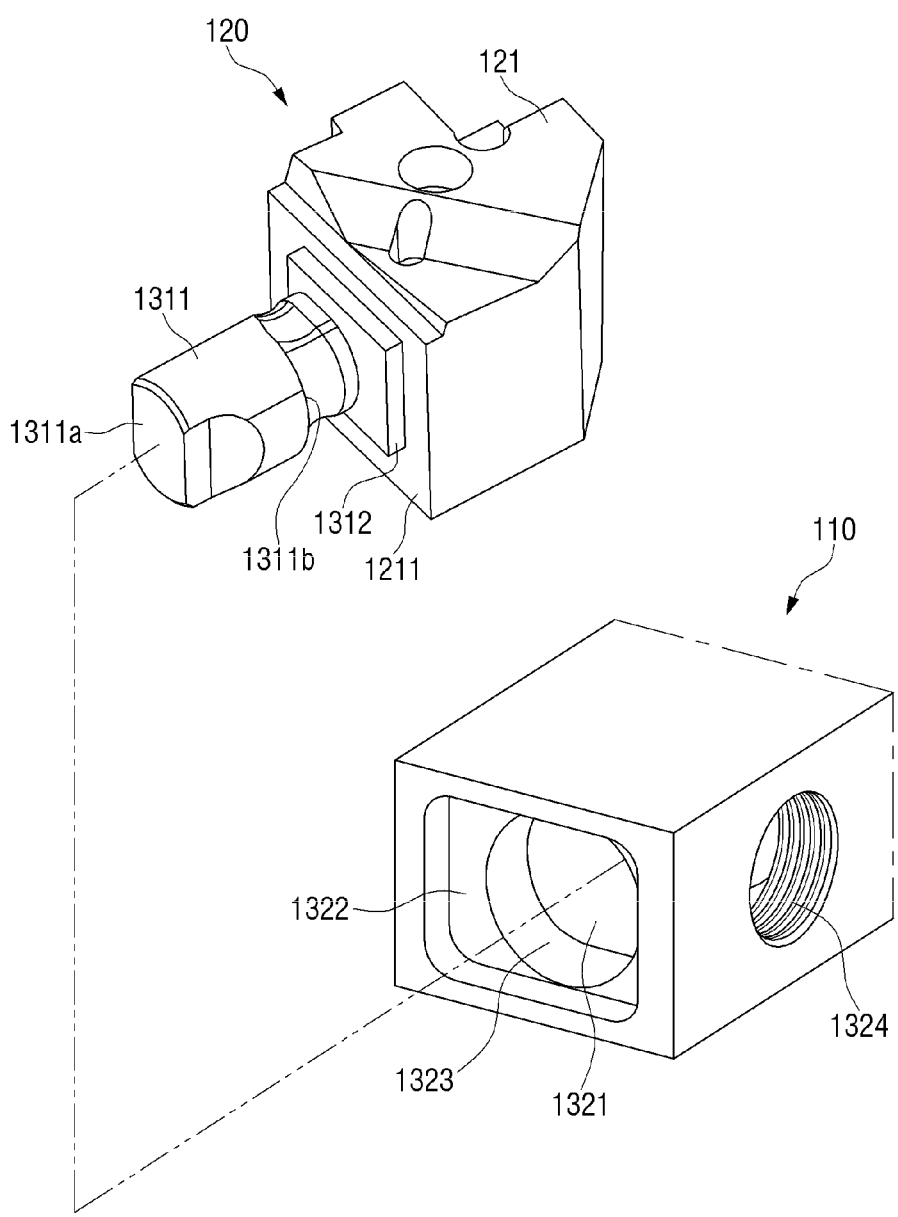
FIG. 5 is a partial another direction separate perspective view schematically illustrating coupling between the insert holder and the tool shank in the cutting tool assembly according to some exemplary embodiments of the present disclosure.
Figure 6:
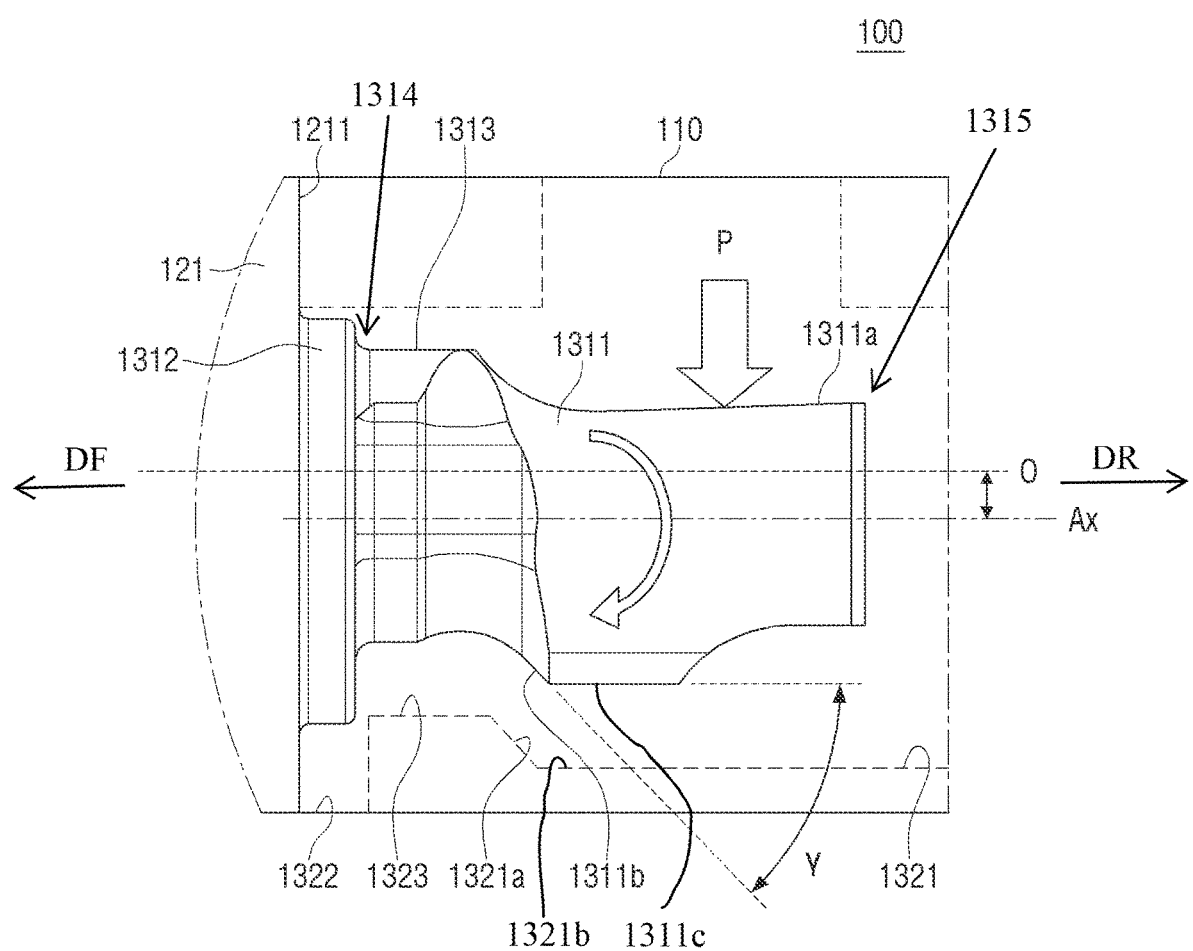
FIG. 6 is a plan view illustrating the coupling protrusion formed on the one surface of the insert body in the cutting tool assembly according to some exemplary embodiments of the present disclosure.
Figure 7A:
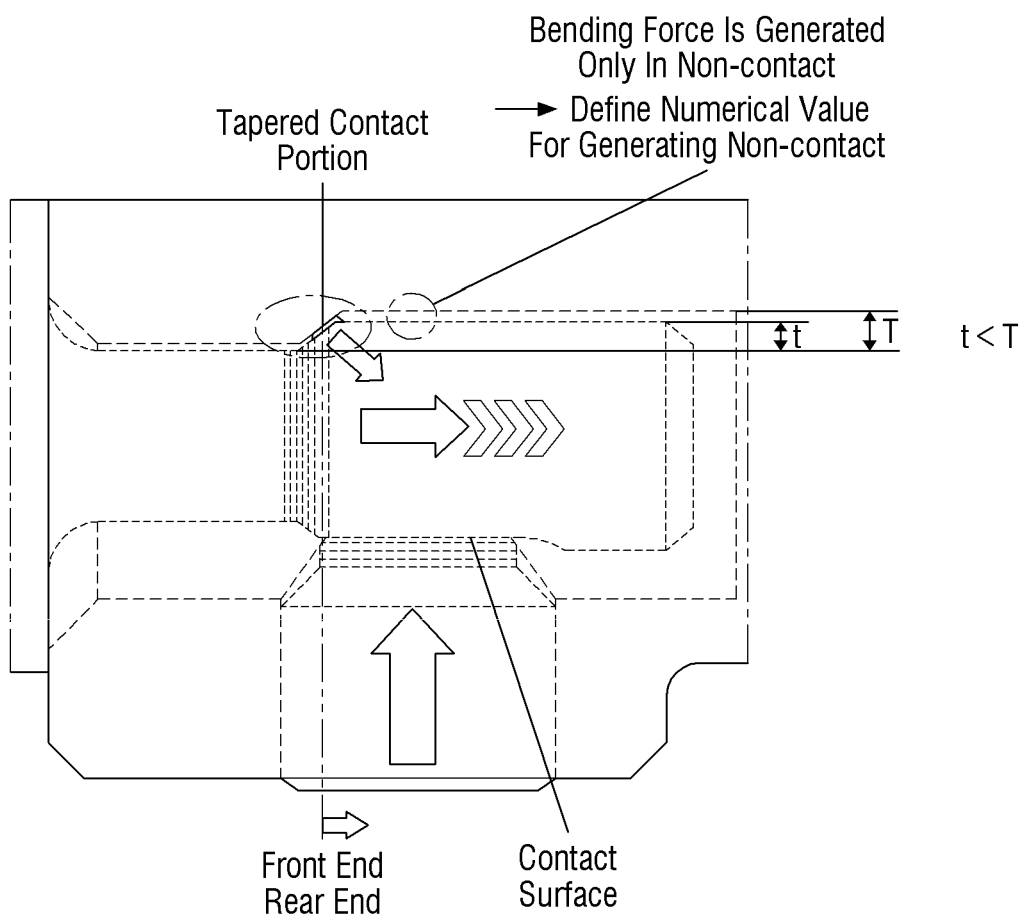
FIGS. 7A and 7B are views schematically illustrating a direction in which a force caused by fixing and coupling according to the pressure of the fastening member while the coupling protrusion is inserted into the coupling opening is generated in the cutting tool assembly according to some exemplary embodiments of the present disclosure.
Figure 7B:
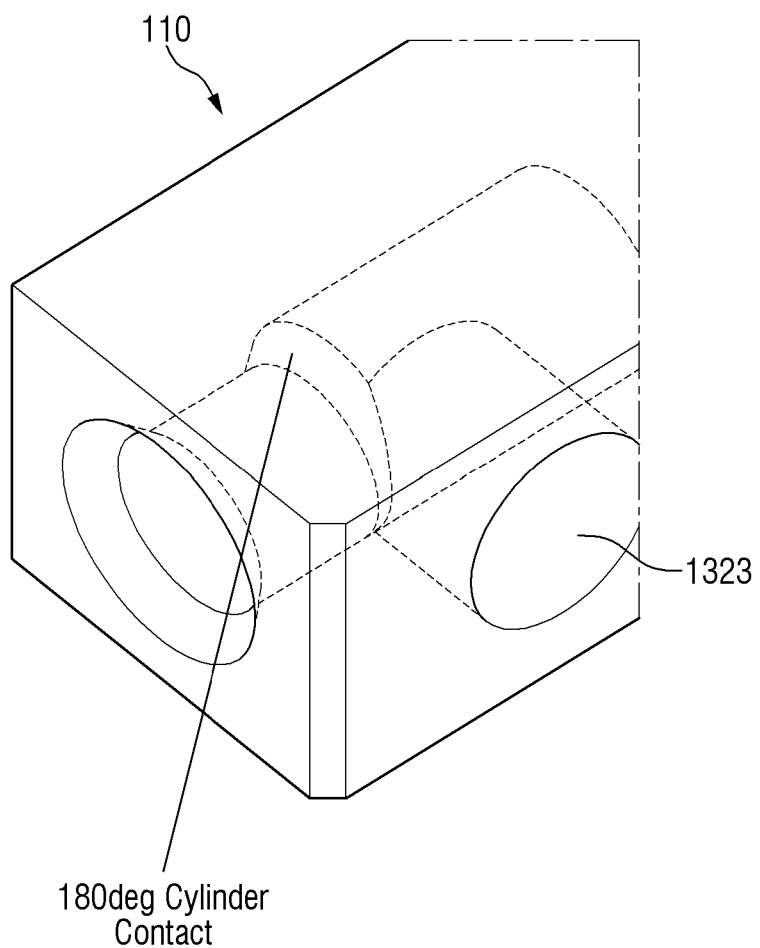
Figure 8:
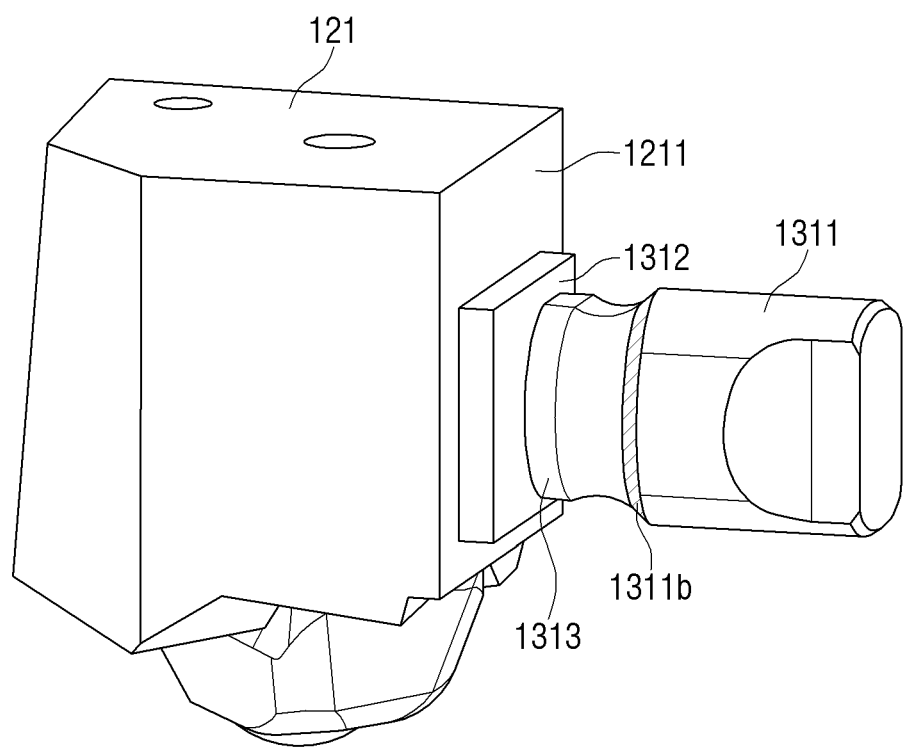
FIG. 8 is a perspective view illustrating a part of the insert holder where the tapered contact portion is formed in the cutting tool assembly according to some exemplary embodiments of the present disclosure.

FIG. 4 is a partial one direction separate perspective view schematically illustrating coupling between the insert holder 120 and the tool shank 110 in the cutting tool assembly 100 according to some exemplary embodiments of the present disclosure. FIG. 5 is a partial another direction separate perspective view schematically illustrating coupling between the insert holder 120 and the tool shank 110 in the cutting tool assembly 100 according to some exemplary embodiments of the present disclosure. FIG. 6 is a plan view illustrating the coupling protrusion 131 formed on the one surface 1211 of the insert body 121 in the cutting tool assembly 100 according to some exemplary embodiments of the present disclosure. FIGS. 7A and 7B are views schematically illustrating a direction in which a force caused by fixing and coupling according to the pressure of the fastening member while the coupling protrusion is inserted into the coupling opening is generated in the cutting tool assembly according to some exemplary embodiments of the present disclosure. FIG. 8 is a perspective view illustrating a part of the insert holder 120 where the tapered contact portion 1311b is formed in the cutting tool assembly 100 according to some exemplary embodiments of the present disclosure. FIG. 9 is a coupling view illustrating a state in which the coupling protrusion 131 is mounted on and then pressed against and coupled to the coupling opening 132 due to the fastening member 133 in the cutting tool assembly 100 according to some exemplary embodiments of the present disclosure.

Referring to FIGS. 4 to 9, the coupling protrusion 131 according to some exemplary embodiments of the present disclosure may be configured to protrude from the insert holder 120, in detail, the one surface 1211 of the insert body 121, and to be inserted into the coupling opening 132 of the tool shank 110. The coupling protrusion 131 is a component configured to couple the insert holder 120 to the tool shank 110. The coupling protrusion 131 has a central axis O which defines a forward-to-rearward direction DF, DR, a forward end 1314 where the coupling protrusion 131 is connected to the one surface 1211 of the insert body 121, and a rear end 1315 which faces in the rearward direction, towards the tool shank 110. Thus, the coupling protrusion 131 protrudes in the rearward direction from said one surface 1211. A central axis O of the coupling protrusion 131 according to some exemplary embodiments of the present disclosure may be spaced apart from a central axis Ax of the tool shank 110 toward the contact surface 1311a so as to form an offset. Also, the coupling protrusion 131 may be configured to move in one direction due to a pressure of the fastening member 133 while being inserted into the coupling opening 132 of the tool shank 110. In detail, the coupling protrusion 131 may be configured to move from one side to another side until the tapered contact portion 1311b of the coupling protrusion 131, which will be described below, comes into contact with a tilted surface 1321a of the coupling opening 132 toward the central axis Ax of the tool shank 110.

In some exemplary embodiments of the present disclosure, the coupling protrusion 131 may include a support surface portion 1312, a neck portion 1313, and a protrusion body 1311.

The support surface portion 1312 may protrude stepwise from the insert holder 120, in detail, the one surface 1211 of the insert body 121. In the present disclosure, the support surface portion 1312 may be described, for example, as a quadrangular shape having a certain width and thickness protruding from the insert holder 120, in detail, the one surface 1211 of the insert body 121. The support surface portion 1312 may be mounted on a support groove 1322 of the tool shank 110 so as to support and restrict the insert holder 120 from being rotated on the tool shank 110 or deviating from a position when the insert 122 is driven to cut. Also, upper and lower circumferential surfaces of a circumferential surface of the support surface portion 1312 may be formed to have sizes fitting into a size of the support groove 1322 of the tool shank 110. Left and right circumferential surfaces of the circumferential surface of the support surface portion 1312 have sizes smaller than the support groove 1322 of the tool shank 110 so as for the support surface portion 1312 to be movable by a certain distance in a direction in which the fastening member 133 pressurizes the coupling protrusion 131.

The neck portion 1313 may protrude from the support surface portion 1312 by a certain length and may have a cylindrical shape having a diameter smaller than the size of the support surface portion 1312.

The protrusion body 1311 may extend from the neck portion 1313 and may have a cylindrical shape having a diameter greater than a diameter of the neck portion 1313 on the basis of an axis of the neck portion 1313. Here, one surface of the protrusion body 1311 may form the contact surface 1311a which is flat as though cut to be closer toward the axis than an end of the neck portion 1313. In some exemplary embodiments of the present disclosure, the contact surface 1311a may be formed as one side surface of a left side surface and a right side surface of the insert holder 120. The contact surface 1311a may be formed stepwise on the end of the neck portion 1313 to be close to the central axis O of the coupling protrusion 131 so as to form a flat surface as though cut. Also, the tapered contact portion 1311b may be formed on a surface opposite to a surface of the protrusion body 1311 on which the contact surface 1311a is formed. The tapered contact portion 1311b may protrude to be tapered with a certain curvature along a perimeter of an end part of the protrusion body 1311 which is connected to the end of the neck portion 1313. The tapered contact portion 1311b may be configured to come into contact with the tilted surface 1321a of the coupling opening 132 which will be described below. Here, as shown in FIGS. 7A and 7B, when the coupling protrusion 131 is pressurized by the fastening member 133, the tapered contact portion 1311b comes into contact with and is fixed to the tilted surface 1321a. Here, a contact area may be an area of the tapered contact portion 1311b which comes into contact (cylindrical contact at 180°) with the perimeter of the end of the neck portion 1313 from an upper part to a lower part thereof along a circumferential surface of 170° to 190°, and preferably, of 180°.

An angle γ of the tapered contact portion 1311b may be within a range of 45±30° and, preferably, 45±15° on the basis of an axial direction of the coupling protrusion 131.

The coupling opening 132 is a groove formed in the tool shank 110 from one side to another side of the tool shank 110. The coupling opening 132 may include a support groove 1322, a connection groove 1323, and an insertion groove 1321.

The support groove 1322 is a groove recessed from one surface of the tool shank 110 corresponding to the support surface portion 1312 to allow the support surface portion 1312 to be mounted and supported. A vertical length of the support groove 1322 may be formed to have a size fitting into the circumferential surface of the support surface portion 1312. When pressurized in one direction by the fastening member 133, sizes of one side and another side of the support groove 1322 may be formed to be greater than the support surface portion 1312 by a movable distance of the insert holder 120 to a position at which the tapered contact portion 1311b comes into contact with the tilted surface 1321a.

The connection groove 1323 is a groove connected to the support groove 1322 and in which the neck portion 1313 is inserted and mounted. The connection groove 1323 may be located between the support groove 1322 and the insertion groove 1321 which will be described below. A size of the connection groove 1323 may be a size into which the coupling protrusion 131 is insertable while being smaller than a size of the support groove 1322.

The insertion groove 1321 may be connected to the connection groove 1323 and extend toward an inside of the tool shank 110. The protrusion body 1311 may be mounted in the insertion groove 1321. One side of the insertion groove 1321, in detail, an inner surface of a part where the fastening groove 1324 is formed, extends with the same size from an end of the connection groove 1323. Here, another side of the insertion groove 1321, in detail, an inner surface of a part where the tapered contact portion 1311*b* is formed may be broad outward from the end of the connection groove 1323. That is, a tapered tilted surface 1321*a* may be formed at a part on the other side of the insertion groove 1321 which is connected to the end of the connection groove 1323 to come into contact with the tapered contact portion 1311*b* and may be formed on the inner surface of the insertion groove 1321 parallel to an axial direction at the end of the tilted surface 1321*a*.

Figure 11:
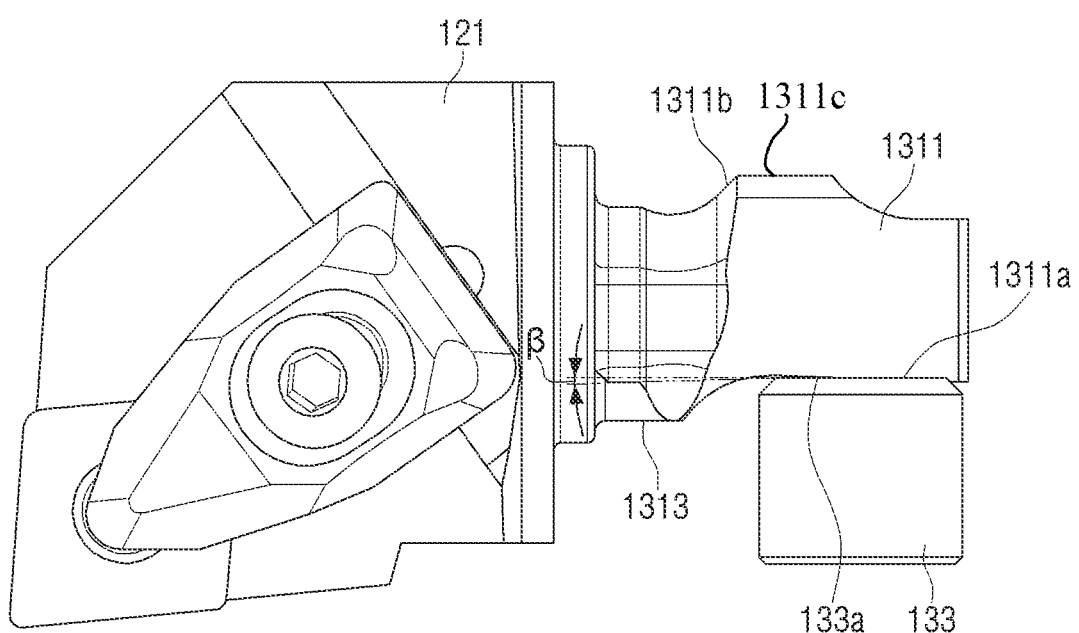
FIG. 11 is a plan view illustrating a contact state between the coupling protrusion 131 and the fastening member in the cutting tool assembly according to some exemplary embodiments of the present disclosure.

When the fastening member 133 is engaged with and pressed against the contact surface 1311*a* through the fastening groove 1324, the coupling protrusion 131 is pushed in a direction in which the fastening member 133 pressurizes and the tapered contact portion 1311*b* comes into contact with the tilted surface 1321*a* so that a bending force may be generated around a contact part. As seen in FIGS. 6, 9 and 11, a non-contact surface 1311*c* is formed on an opposite side of the coupling protrusion 131 and faces in a direction away from the contact surface 1311*a*, the non-contact surface 1311*c* being adjacent the tapered contact portion 1311*b*.

That is, as shown in FIGS. 7A and 7B, when a cutting operation is performed while the insert holder 120 and the tool shank 110 are coupled together, an axial force caused by pressure, a pressure perpendicular to an axial direction and generated while the fastening member 133 pressurizes the contact surface 1311*a*, and a diagonal fixing force caused by contact between the tapered contact portion 1311*b* and the tilted surface 1321*a* may be generated when the cutting tool assembly 100 is operated.

Also, as shown in 7A, 7B and 9, when the fastening member 133 pressurizes the coupling protrusion 131 through the fastening groove 1324, the tapered contact portion 1311*b* comes into contact with the tilted surface 1321*a*. Here, the non-contact surface 1311*c* of the coupling protrusion 131 which faces in a direction away from the contact surface 1311*a*, may be spaced at a certain distance apart from and not come into contact with the inner surface 1321*b* of the insertion groove 1321. In order not to allow one surface the non-contact surface 1311*c* to come into contact with the inner surface of the insertion groove 1321, a thickness t from a circumferential end of the neck portion 1313 to an end of the non-contact surface 1311*c* of the coupling protrusion 131 may be smaller than a thickness T between an end (one inner circumference) of the connection groove 1323 and an end (one inner circumference) of the insertion groove 1321 (T>t).

That is, a fixing force is generated in a diagonal direction due to contact between the tapered contact portion 1311*b* and the tilted surface 1321*a* and non-contact between the one surface of the coupling protrusion 131 facing the contact surface 1311*a* and the inner surface of the insertion groove 1321 so that a bending force may be generated by the fixing force, the above-described pressure, and the axial force. Accordingly, coupling reliability may be secured while the coupling protrusion 131 is coupled to the coupling opening 132 by the fastening member 133.

Figure 10A:
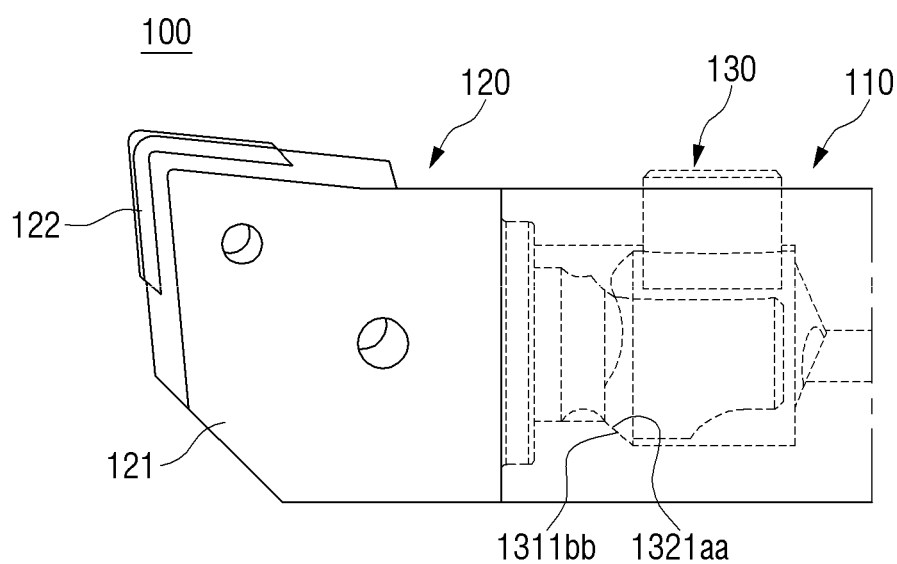
FIGS. 10A to 10C are views schematically illustrating different shapes of the contact surface formed on the coupling protrusion and the tapered contact portion formed in the coupling opening in the cutting tool assembly according to some exemplary embodiments of the present disclosure.
Figure 10B:
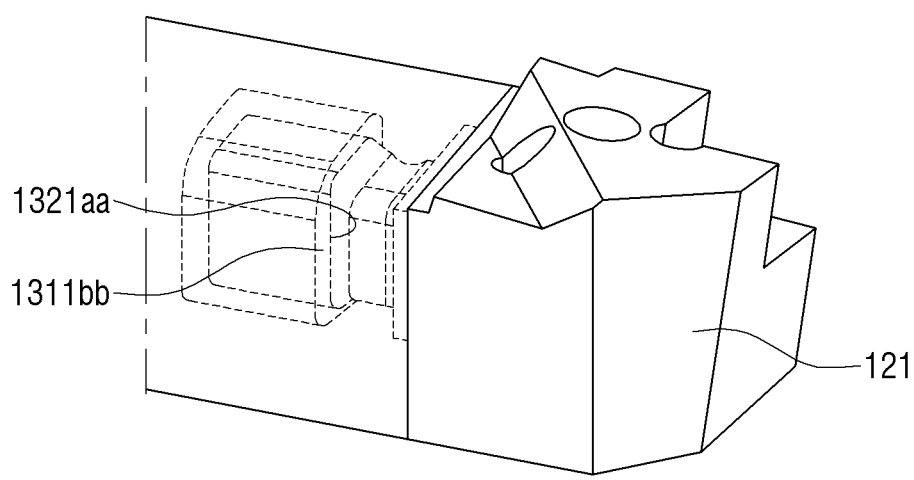
Figure 10C:
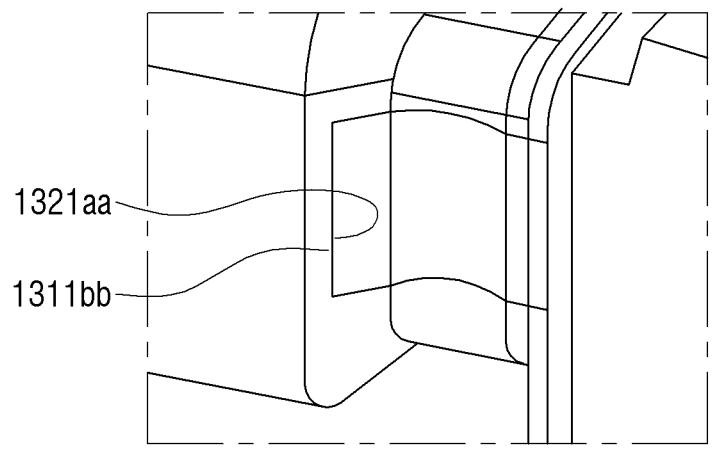

FIGS. 10A to 10C are views schematically illustrating different shapes of the contact surface formed on the coupling protrusion and the tapered contact portion formed in the coupling opening in the cutting tool assembly according to some exemplary embodiments of the present disclosure.

First, in FIGS. 1 to 9, it is described as an example that a tapered tilted portion of the present disclosure has a cylindrical shape having a certain curvature. However, the shape of the tapered tilted portion is not limited thereto.

For example, as shown in FIGS. 10A to 10C, a corner area has a certain curvature and parts connected to each corner have a linear quadrangular shape so that the tapered tilted portion may be formed to correspond to the quadrangular shape.

Figure 12:
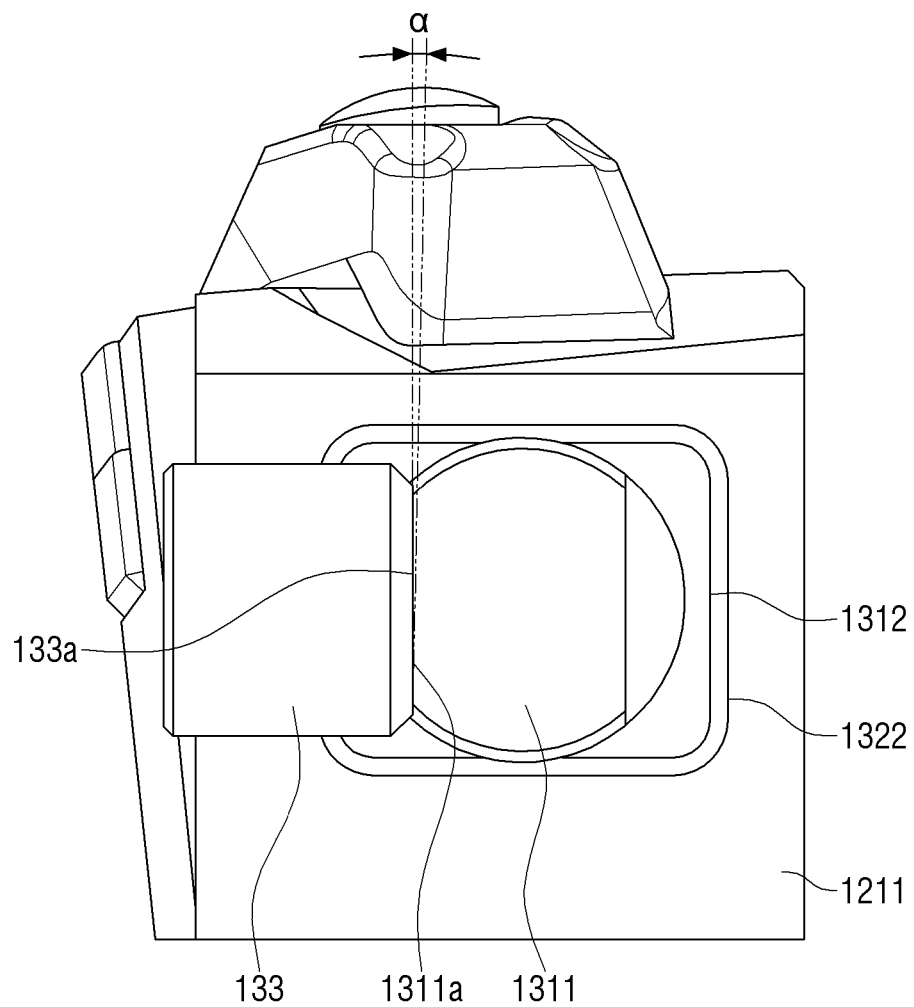
FIG. 12 is a rear view illustrating the contact state between the coupling protrusion and the fastening member in the cutting tool assembly according to some exemplary embodiments of the present disclosure.

FIG. 11 is a plan view illustrating a contact state between the coupling protrusion 131 and the fastening member 133 in the cutting tool assembly 100 according to some exemplary embodiments of the present disclosure. FIG. 12 is a rear view illustrating the contact state between the coupling protrusion 131 and the fastening member 133 in the cutting tool assembly 100 according to some exemplary embodiments of the present disclosure.

Referring to FIGS. 11 and 12 (also referring to FIG. 8), the contact surface 1311*a* according to some exemplary embodiments of the present disclosure may be formed to be a flat surface to come into contact with an end 133*a* of the fastening member 133, and the end 133*a* of the fastening member 133 may be formed to be a flat surface to come into contact with and be pressed against the contact surface 1311*a*. Here, when coming into contact with the end 133*a* of the fastening member 133, the contact surface 1311*a* may be configured so that not all surfaces come into contact therewith and may have a dip with a certain angle to allow a contact part to come into contact with a rear surface and a lower area. That is, the contact surface 1311*a* may be formed to be a flat surface to be tilted at a first angle $\beta$ on the basis of a direction toward the central axis O of the coupling protrusion 131 and tilted at a second angle $\alpha$ on the basis of a direction perpendicular to the direction toward the central axis and may be configured to provide an additional bending force around a contact part between the tapered contact portion 1311*b* and the tilted surface 1321*a*. In the present disclosure, it may be described as an example that the first angle $\beta$ is formed to be 1.5 to 2.5° and, preferably, 2° and the second angle $\alpha$ is formed to be 0.5 to 1.5° and, preferably, 1°. As described above, as the contact surface 1311*a* comes into contact with the end of the fastening member 133 while deviating by 2° in a plane direction and deviating by 1° in a rear direction, when the end 133*a* of the fastening member 133 pressurizes the contact surface 1311*a*, an additional bending force may be provided around a contact part between the tapered contact portion 1311*b* and the tilted surface 1321*a* so as to improve a fastening force and to prevent releasing or movement caused by operation.

Figure 13:
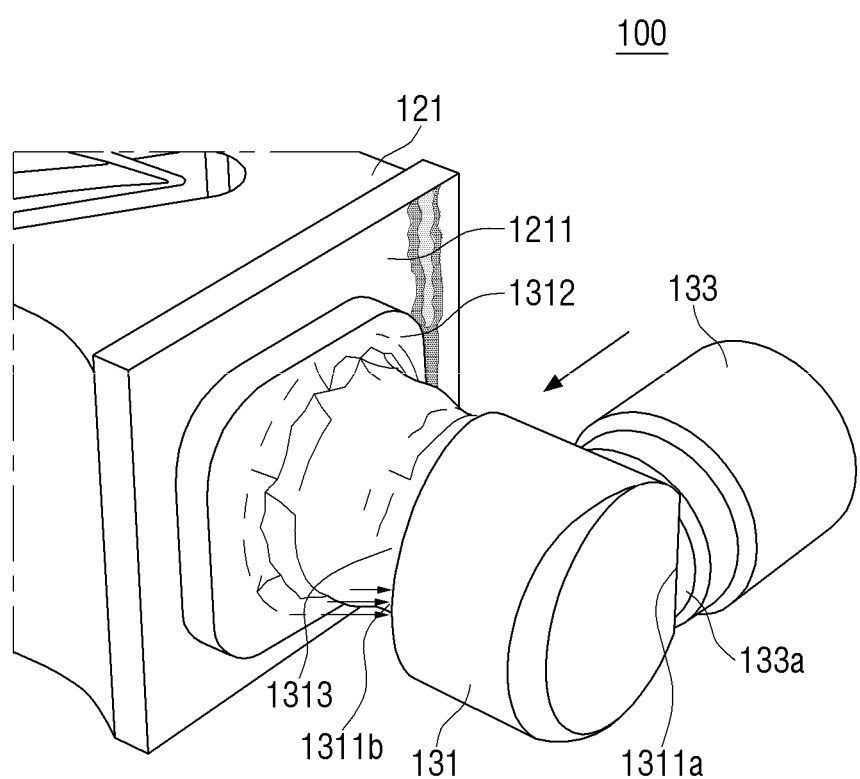
FIG. 13 is a view schematically illustrating occurrence of a coupling force caused by contact induced and generated between the one surface of the insert holder and the tapered contact portion when the fastening member comes into contact with and is pressed against the contact surface in the cutting tool assembly according to some exemplary embodiments of the present disclosure.
Figure 14:
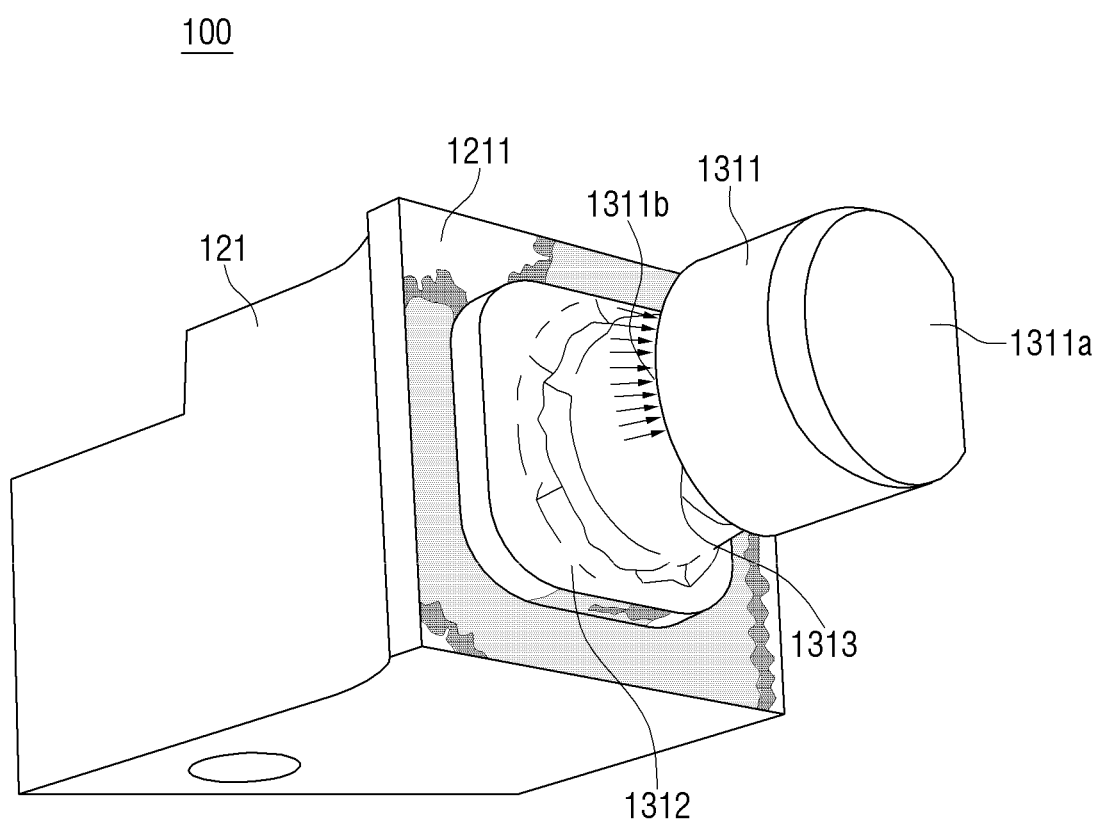
FIG. 14 is a view schematically illustrating a state of the coupling force generated between the one surface of the insert holder and the tapered contact portion when the fastening member comes into contact with and is pressed against the contact surface in the cutting tool assembly according to some exemplary embodiments of the present disclosure.
Figure 15:
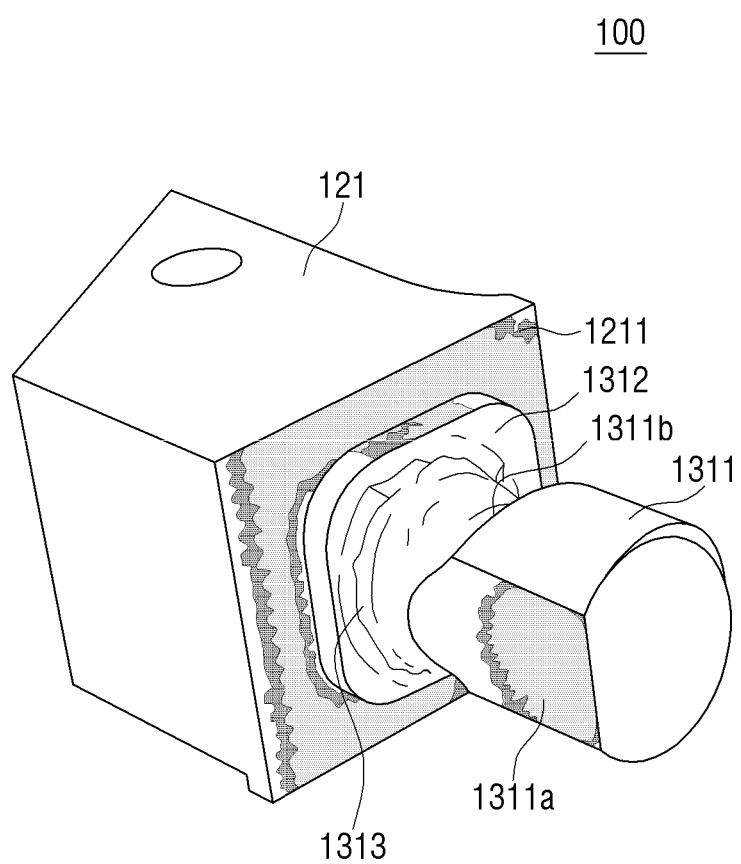
FIG. 15 is a view schematically illustrating the coupling force generated due to contact when the fastening member comes into contact with and is pressed against the contact surface when viewed in a different direction in the cutting tool assembly according to some exemplary embodiments of the present disclosure.

FIG. 13 is a view schematically illustrating occurrence of a coupling force caused by contact induced and generated between the one surface of the insert holder 120 and the tapered contact portion 1311*b* when the fastening member 133 comes into contact with and is pressed against the contact surface 1311*a* in the cutting tool assembly 100 according to some exemplary embodiments of the present disclosure. FIG. 14 is a view schematically illustrating a state of the coupling force generated between the one surface of the insert holder 120 and the tapered contact portion 1311*b* when the fastening member 133 comes into contact with and is pressed against the contact surface 1311*a* in the cutting tool assembly 100 according to some exemplary embodiments of the present disclosure. FIG. 15 is a view schematically illustrating the coupling force generated due to contact when the fastening member 133 comes into contact with and is pressed against the contact surface 1311*a* when viewed in a different direction in the cutting tool assembly 100 according to some exemplary embodiments of the present disclosure.

Referring to FIGS. 13 to 15, as described above, when the fastening member 133 presses the coupling protrusion 131 to fasten the insert holder 120 to the tool shank 110, the coupling protrusion 131 is pushed by a certain amount in a direction toward the central axis Ax of the tool shank 110 and the tapered contact surface 1311a having a circumferential shape comes into contact with the tilted surface 1321a while a contact area gradually increases. Here, as the insert holder 120, in detail, the one surface 1211 of the insert body 121 comes into contact with the one surface of the tool shank 110 while a contact area gradually increases.

In detail, when the fastening member 133 is engaged with and pressurized by the contact surface 1311a through the fastening groove 1324, the one surface 1211 of the insert body 121 is hinged on the one surface of the tool shank 110. Here, the one surface of the tool shank 110 may gradually come into contact with the one surface 1211 of the insert body 121 and may come into sequential contact with the tapered contact portion 1311b and the support surface portion 1312 so as to be pressed against and coupled thereto as contact areas increase.

Due to contact between the tilted surface 1321a and the tapered contact surface 1311a having the circumferential shape, an axial force of fastening the coupling protrusion 131 to the tool shank 110 may be generated. Also, since a certain distance difference is formed between the contact surface 1311a and the tapered contact portion 1311b, a bending force is generated at the coupling protrusion 131 and a contact force between one surface of the insert holder 120 and one surface of the tool shank 110 increases so that the insert holder 120 and the tool shank 110 may be maintained to be firmly fastened to each other even while the cutting tool assembly 100 performs the cutting operation.

Figure 16:
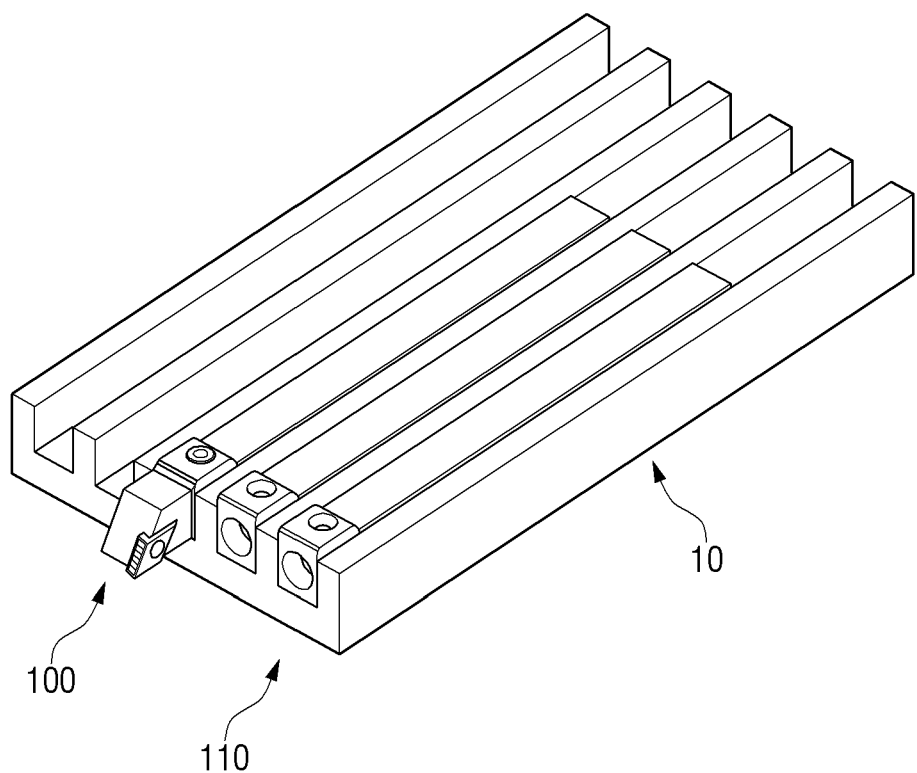
FIG. 16 is a view schematically illustrating a state in which the cutting tool assembly according to some exemplary embodiments of the present disclosure is coupled to a tool post.

FIG. 16 is a view schematically illustrating a state in which the cutting tool assembly 100 according to some exemplary embodiments of the present disclosure is coupled to a tool post.

Referring to FIG. 16, since a direction in which the fastening member 133 pressurizing the insert holder 120 is fastened is perpendicular to a direction in which a main cutting force of the insert 122 is received, when the cutting tool assembly 100 is fastened to a tool post 10, fastening of the insert or fastening between the insert holder 120 and the tool shank 110 may not be interfered. When the cutting tool assembly 100 is fastened to the tool post 10, the cutting tool assembly 100, in detail, the insert holder 120, may protrude a little from the tool post 10 so as to reduce vibrations while a precise cutting operation is performed.

In the insert holder and the cutting tool assembly including the same according to the exemplary embodiment of the present disclosure, since the insert holder is detachably provided on a tool shank, the insert holder including a variety of shapes of inserts may be replaceably provided on the tool shank.

Also, in the insert holder and the cutting tool assembly including the same according to the exemplary embodiment of the present disclosure, since a variety of insert shapes may be used when only the insert holder is replaced, a replacement time may be reduced and replacement may be performed with ease so as to improve productivity due to a reduction in replacement time and easy replacement.

Also, in the insert holder and the cutting tool assembly including the same according to the exemplary embodiment of the present disclosure, since a tapered contact portion having a circumferential shape is formed on a coupling protrusion of a tool shank for the insert holder as a surface opposite to a contact surface of a fastening member, the tapered contact portion is held by and mounted on and comes into contact with and is coupled to an internal coupling surface of the tool shank by a bending force caused by a pressure of the fastening member so that reliability in coupling between the insert holder and the tool shank may be secured and reliability in coupling between the insert holder and the tool shank may be secured while a cutting tool is operated.

Embodiments of the present disclosure have been described above with reference to the accompanying drawings, but those of ordinary skill in the art to which the present disclosure pertains should understand that the present disclosure may be practiced in other specific forms without changing the technical idea or essential features thereof. Therefore, the embodiments described above are illustrative in all aspects and should not be understood as limiting.

What is claimed is:

1. A cutting tool assembly comprising:
   a tool shank comprising a coupling opening, and
   an insert holder comprising:
      an insert body to which an insert is coupled and detachably attached, and
      a coupling protrusion protruding from one surface of the insert body and detachably coupled to the tool shank,
   wherein the coupling protrusion comprises:
      a central axis (O) defining a forward-to-rearward direction (DF, DR),
      a forward end where the coupling portion is attached to the insert body, the coupling portion protruding in the rearward direction from said one surface of the insert body,
      a rear end facing in the rearward direction towards the tool shank,
      a tapered contact portion which comes into contact with the coupling opening and provides a fixing force to fix the insert holder to the tool shank, and
      a contact surface spaced apart from and rearward of the tapered contact portion along the coupling protrusion's central axis (O), the contact surface being coupled to a fastening member.

2. The cutting tool assembly of claim 1, wherein the coupling protrusion further comprises:
   a support surface portion protruding stepwise from said one surface of the insert body;
   a neck portion protruding from the support surface portion; and
   a protrusion body extending from the neck portion and having:
      a first surface on which the contact surface is formed, and
      another surface adjacent the neck portion and on which the tapered contact portion is formed.

3. The cutting tool assembly of claim 2, wherein a circumferential surface of the tapered contact portion extends 170° to 190° about the coupling protrusion's central axis (O) from an upper part to a lower part of the neck portion, comes into contact with the coupling opening.

4. The cutting tool assembly of claim 2, wherein the coupling opening comprises:

a support groove recessed from one surface of the tool shank, corresponding to the support surface portion, and on which the support surface portion is mounted to be supported;

a connection groove connected to the support groove and into and on which the neck portion is inserted and mounted; and an insertion groove connected to an inside of the tool shank in the connection groove, in which the protrusion body is mounted, and including a tapered tilted surface as a part connected to the connection groove.

5. The cutting tool assembly of claim 4, wherein:

a fastening groove is formed in a side surface of the tool shank, the fastening groove configured to communicate with one surface of the insertion groove; and the fastening member is inserted into the fastening groove.

6. The cutting tool assembly of claim 4, wherein a center of the coupling protrusion is mounted on a center of the coupling opening of the tool shank with an offset in a direction toward the contact surface.

7. The cutting tool assembly of claim 4, wherein when the fastening member pressurizes the coupling protrusion through the fastening groove so that the tapered contact portion comes into contact with the tapered tilted surface, a non-contact surface of the coupling protrusion which faces in direction away from the contact surface is spaced at a certain distance apart from and does not come into contact with an inner surface of the insertion groove.

8. The cutting tool assembly of claim 7, wherein to prevent the inner surface of the insertion groove and the non-contact surface from coming into contact with each other, a first thickness (t) from a circumferential end of the neck portion to an end of the non-contact surface of the coupling protrusion is smaller than a second thickness (T) between an end of the connection groove and an end of the insertion groove.

9. The cutting tool assembly of claim 4, wherein an angle of the tapered contact portion is formed to be within a range of 45±30° on the basis of an axial direction of the coupling protrusion.

10. The cutting tool assembly of claim 9, wherein when the fastening member is engaged with and pressed against the contact surface, the coupling protrusion is pushed in a pressurizing direction so as to generate a bending force, and the tapered contact portion comes into contact with and is coupled to the tapered tilted surface of the insertion groove.

11. The cutting tool assembly of claim 10, wherein the contact surface forms a flat surface cut stepwise from an end of the protrusion body and to be closer to the central axis (O) of the coupling protrusion.

12. The cutting tool assembly of claim 11, wherein the contact surface is configured to be tilted at a first angle on the basis of an axial direction of the coupling protrusion.

13. The cutting tool assembly of claim 12, wherein forming the first angle to the contact surface and a bending force is provided to pressurize as contact starts with a rear area of the contact surface according to pressurizing of the fastening member.

14. The cutting tool assembly of claim 11, wherein the contact surface is formed as a flat surface tilted at a second angle on the basis of a direction perpendicular to the axial direction of the coupling protrusion.

15. The cutting tool assembly of claim 14, wherein the second angle is formed on the contact surface and vertical movement of the coupling protrusion is restricted as the coupling protrusion comes into contact with a lower area of the contact surface according to pressurizing of the fastening member.

16. The cutting tool assembly of claim 1, wherein:

the tapered contact portion is located between the contact surface and said one surface of the insert body where contact is made with one surface of the tool shank, so that when the fastening member presses the contact surface, a bending force is applied at a given distance away from the tapered contact portion.

17. The cutting tool assembly of claim 1, wherein:

the coupling protrusion's tapered contact portion is positioned between said one surface of the insert body and said contact surface coupled to the fastening member;

the coupling protrusion further comprises a non-contact surface formed on an opposite side of the coupling protrusion from the contact surface, the non-contact surface being located adjacent the tapered contact portion; and when the fastening member presses the contact surface:
the tapered contact portion presses against a tilted surface formed on the tool shank, thereby creating a bending force at the coupling protrusion which increases a contact force between said one surface of the insert holder and a surface of the tool shank; and
the non-contact surface is spaced apart from and does not contact an inner surface of an insertion groove formed in the tool shank.

18. An insert holder comprising:

an insert body configured to be mounted on a front surface of a tool shank and to which an insert is detachably fastened; and a coupling protrusion protruding from one surface of the insert body, the coupling protrusion comprising:
a central axis (O) defining a forward-to-rearward direction (DF, DR),
a forward end where the coupling portion is attached to the insert body, the coupling portion protruding in the rearward direction from said one surface of the insert body,
a rear end facing in the rearward direction,
a tapered contact portion configured to be detachably coupled to the tool shank and configured to provide a fixing force for being fixed to the tool shank, and
a contact surface spaced apart from and rearward of the tapered contact portion along the coupling protrusion's central axis (O), the contact surface configured to come into close contact with a fastening member extending in a direction transverse to the tool shank.

19. The insert holder of claim 18, wherein an angle of the tapered contact portion is formed to be within a range of 45±30° on the basis of an axial direction of the coupling protrusion.

20. The insert holder of claim 18, wherein the contact surface is provided to be tilted at a first angle on the basis of an axial direction of the coupling protrusion, and wherein the first angle is formed on the contact surface and a bending force is provided to pressurize as contact starts with a rear area of the contact surface according to pressurizing of the fastening member.

21. The insert holder of claim 18, wherein the contact surface is formed as a flat surface tilted at a second angle on the basis of a direction perpendicular to an axial direction of the coupling protrusion, and the second angle is formed on the contact surface and vertical movement of the coupling protrusion is restricted as the coupling protrusion comes into contact with a lower area of the contact surface according to pressurizing of the fastening member.

22. The insert holder of claim 18, wherein:

the tapered contact portion is located between the contact surface and said one surface of the insert body, so that when the fastening member presses the contact surface, a bending force is applied at a given distance away from the tapered contact portion.

23. The insert holder of claim 18, wherein:

the coupling protrusion further comprises:
- a neck portion connected to said one surface of the insert body;
- a protrusion body extending from the neck portion, the tapered contact portion being formed on along a perimeter of an end part of the protrusion body; and
- a non-contact surface formed on an opposite side of the coupling protrusion from the contact surface, the non-contact surface being located adjacent the tapered contact portion; and the coupling protrusion's tapered contact portion is positioned between said one surface of the insert body and said contact surface.

* * * * *